(12) United States Patent
Hubo et al.

(10) Patent No.: US 10,565,794 B2
(45) Date of Patent: Feb. 18, 2020

(54) DIGITALLY OVERLAYING AN IMAGE WITH ANOTHER IMAGE

(71) Applicant: AIM SPORT VISION AG, Kriens-Lucerne (CH)

(72) Inventors: Erik Jozef Benoit Hubo, Lucerne (CH); Bernardus De Roos, Kriens-Lucerne (CH); Daniel Bernard De Roos, Kriens-Lucerne (CH)

(73) Assignee: AIM SPORT VISION AG, Kriens-Lucerne (CH)

( * ) Notice: Subject to any disclaimer, the term of this patent is extended or adjusted under 35 U.S.C. 154(b) by 19 days.

(21) Appl. No.: 15/573,681

(22) PCT Filed: May 10, 2016

(86) PCT No.: PCT/EP2016/060443
§ 371 (c)(1),
(2) Date: Nov. 13, 2017

(87) PCT Pub. No.: WO2016/180827
PCT Pub. Date: Nov. 17, 2016

(65) Prior Publication Data
US 2018/0122144 A1   May 3, 2018

(30) Foreign Application Priority Data

May 13, 2015 (EP) .................................. 15167637

(51) Int. Cl.
*G06T 19/00* (2011.01)
*G06T 15/20* (2011.01)

(52) U.S. Cl.
CPC ............ *G06T 19/006* (2013.01); *G06T 15/20* (2013.01); *G06T 2215/16* (2013.01)

(58) Field of Classification Search
CPC .. G06K 9/00664–00704; G06F 3/0481; G06F 3/04817; G06F 9/4443;
(Continued)

(56) References Cited

U.S. PATENT DOCUMENTS

2005/0001852 A1* 1/2005 Dengler ................... G06T 15/20
  345/633
2015/0082168 A1* 3/2015 Brieussel ............ G06F 3/04842
  715/716

FOREIGN PATENT DOCUMENTS

WO    01/58147 A1    8/2001
WO    2010/049578 A1  5/2010
(Continued)

OTHER PUBLICATIONS

Graham Thomas et al: "Virtual Graphics for Broadcast Production", Computer, IEEE, US, vol. 6, No. 7, Jul. 1, 2009 (Jul. 1, 2009), pp. 42-47, XP011264207, ISSN: 0018-9162.
(Continued)

*Primary Examiner* — Todd Buttram
(74) *Attorney, Agent, or Firm* — Young & Thompson (57) ABSTRACT

A system for digitally overlaying an image with another image is disclosed. A storage is for storing a model of a real world space, wherein the model includes an overlay surface to be overlaid with an overlay image. A camera parameter interface is for receiving camera parameters. A camera image interface is for receiving at least one image. A positioner is for determining a position of the overlay surface within the at least one captured image based on the model and the camera parameters. A detector is for detecting an occluding object based on an image property of the occluding object and a detection image. An overlayer is for
(Continued)

overlaying a non-occluded portion of the overlay surface in the selected captured image with the overlay image to obtain an output image.

15 Claims, 5 Drawing Sheets

(58) Field of Classification Search
CPC .. G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
See application file for complete search history.

(56) References Cited

FOREIGN PATENT DOCUMENTS

| | | | | |
|---|---|---|---|---|
| WO | WO-2010049578 A1 * | 5/2010 | ............ | G03B 15/08 |
| WO | 2013/132032 A1 | 9/2013 | | |
| WO | WO-2013132032 A1 * | 9/2013 | ........... | H04N 5/2258 |
| WO | WO-2017028010 A1 * | 2/2017 | ............... | G06T 7/00 |

OTHER PUBLICATIONS

International Search Report, dated Jun. 30, 2016, from corresponding PCT/EP2016/060443 application.

* cited by examiner

DIGITALLY OVERLAYING AN IMAGE WITH ANOTHER IMAGE

FIELD OF THE INVENTION

The invention relates to a digital overlay in a captured image.

BACKGROUND OF THE INVENTION

Signage is often placed at public spaces, in particular locations with high visibility, such as airports, shopping malls, train stations or sport arenas. Signs include static boards, such as wooden boards, provided with a fixed image by means of printing or painting or the like. Recent developments in display technology have led to the introduction of active boards that are provided with a display device, such as LED boards. In one typical application, active or static boards can extend along the side of a sports field, to display advertisements or other announcements. The messages displayed by an active screen may be captured by a TV camera and broadcast or recorded with the actual sports event, so that a large audience may be achieved for the messages. At the same time, the signs and the images being displayed thereon may be viewed by the spectators that are present at the location of the event itself.

In relation to static boards, WO 01/58147 A1 discloses a method for modifying a visible object shot with a television camera. The object is marked by means of one or more marking surfaces disposed in the area of the object or in its vicinity. WO 01/58147 A1 discloses a rectangular advertisement in which all corners are marked with reference objects, e. g. circles of a given color, by means of which the location of the object in the television picture can be accurately defined. The marking surfaces are identifiable on the basis of radiation differing from other radiation in the area being shot, at least one of said marking surfaces differing in radiation from the environment on the basis of a property other than the color of visible light. The marking surface is identified using at least one identifying detector which is separate from the detectors of the television camera and by means of which the object is shot substantially from the same shooting direction with the television camera. The relationship between the picture coordinates of the television camera and those of the identifying detector is determined, the areas of the object that are visible in the television picture are determined by means of marking surfaces detected, the video signal of the television picture for the areas corresponding to the object is modified in a predetermined manner, and the modified video signal is transmitted.

SUMMARY OF THE INVENTION

It would be advantageous to have an improved signage system in which captured images can be provided with a digital overlay.

According to an aspect of the present disclosure, a system is provided for digitally overlaying an image with another image, comprising a storage for storing a model of a real world space, wherein the model includes an overlay surface to be overlaid with an overlay image;

a camera parameter interface for receiving camera parameters, which calibrate at least one camera with respect to coordinates of the model;

a camera interface for receiving at least one image captured with respective said at least one camera substantially at the same time;

a positioner for determining a position of the overlay surface within said at least one captured image based on the model and the camera parameters;

a detector for detecting an occluding object at least partially occluding the overlay surface in a selected captured image of said at least one captured image based on an image property of the occluding object and a detection image that is an image of said at least one captured image;

an overlayer for overlaying a non-occluded portion of the overlay surface in the selected captured image with the overlay image to obtain an output image; and an output interface for outputting an output image.

By the three-dimensional model of the real world space and the camera calibration relative to the coordinates of the three-dimensional model, it is not necessary to provide all corners of the object to be overlaid with markers. Also, it is not necessary to apply a marking surface on the advertisement boards. Instead, occluding objects are detected based on an image property of the occluding object itself.

According to another aspect of the present disclosure, a method is provided for digitally overlaying an image with another image, the method comprising creating a model of a real world space, wherein the model includes an overlay surface to be overlaid with an overlay image;

identifying camera parameters, which calibrate at least one camera with respect to coordinates of the model;

capturing at least one image with respective said at least one camera substantially at the same time;

positioning the overlay surface within said at least one captured image based on the model and the camera parameters;

detecting an occluding object at least partially occluding the overlay surface in a selected captured image of said at least one captured image based on an image property of the occluding object and a detection image that is an image of said at least one captured image;

overlaying a non-occluded portion of the overlay surface in the selected captured image with the overlay image.

According to another aspect of the present disclosure, a computer program product is provided, comprising instructions for causing a computer to perform the steps of storing a model of a real world space, wherein the model includes an overlay surface to be overlaid with an overlay image;

receiving camera parameters, which calibrate at least one camera with respect to coordinates of the model;

receiving at least one image captured with respective said at least one camera substantially at the same time;

determining a position of the overlay surface within said at least one captured image based on the model and the camera parameters;

detecting an occluding object at least partially occluding the overlay surface in a selected captured image of said at least one captured image based on an image property of the occluding object and a detection image that is an image of said at least one captured image;

overlaying a non-occluded portion of the overlay surface in the selected captured image with the overlay image to obtain an output image; and outputting an output image.

The person skilled in the art will understand that the features described above may be combined in any way deemed useful. Moreover, modifications and variations described in respect of the system may likewise be applied to the method and to the computer program product, and modifications and variations described in respect of the method may likewise be applied to the system and to the computer program product.

BRIEF DESCRIPTION OF THE DRAWINGS

In the following, aspects of the invention will be elucidated by means of examples, with reference to the drawings. The drawings are diagrammatic and may not be drawn to scale.

DETAILED DESCRIPTION OF EMBODIMENTS

In the following description, a number of example embodiments will be described in more detail. However, the description of these embodiments is not intended to limit the scope of protection. Also, examples of particular components of the system will be described in the following. However, it is noted that in view of the present disclosure, the techniques described in respect thereto may be applied in a similar way using alternative or modified components. Also, the features described in relation to the system may be likewise be applied to the method and computer program, and the features described in relation to the method may likewise be implemented by means of the system and computer program.

Figure 1:
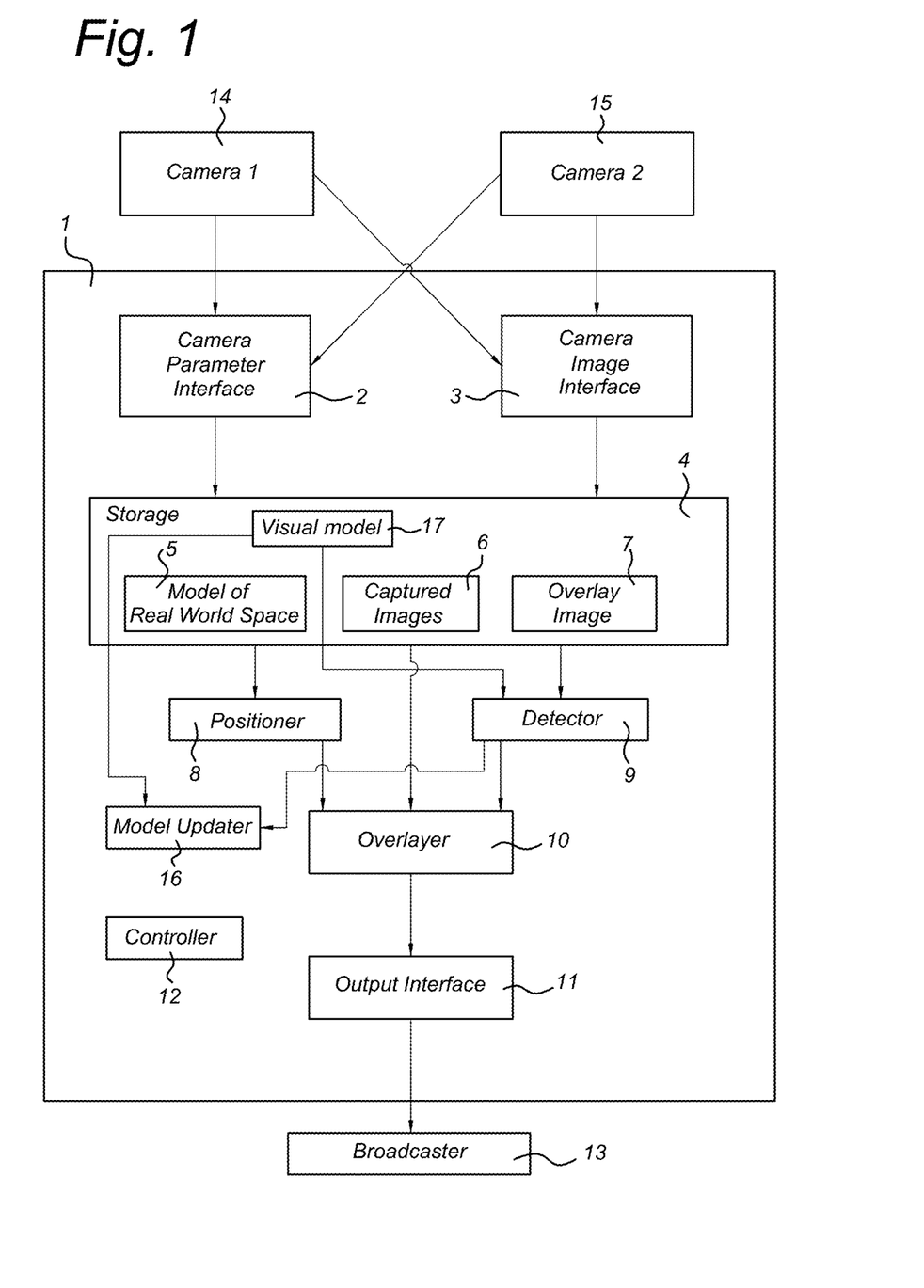
FIG. 1 is a block diagram of a system for digitally overlaying an image with another image.

FIG. 1 illustrates a system for digitally overlaying an image with another image. Several components of the system may be implemented in a single digital overlay device 1. However, this is not a limitation. The components and the functionality performed by each components may be distributed over a plurality of devices.

At least one camera 14, 15 is provided for capturing images. Two cameras have been illustrated as an example. Captured images are received by the camera interface 3. This camera interface 3 may comprise one or more data communication ports, such as HDMI ports, for example. Further, camera parameters of each of the cameras 14, 15 are detected by detectors known in the art per se, and described elsewhere in this document. The camera parameters are received by the camera parameter interface 2. This can comprise one or more further data communication ports such as USB interfaces. It will be understood that the interfaces 14, 15 can be combined in a single data communication port, or can comprise several data communication ports to receive data for different cameras separately. The system comprises a memory or storage 4 which can comprise random access memory and/or non-volatile memory such as flash and/or magnetic disks. The storage 4 comprises storage space for a model of a real world space 5, one or more captured images 6, an overlay image 7, and other data.

The system comprises a positioner 8, a detector 9, and an overlayer 10. These components may be implemented, for example, by means of software modules which may be stored, for example, in the storage 4. Alternatively, these modules may be implemented by means of a dedicated electronic circuitry or e.g. an FPGA. The system may comprise a controller 12 which controls operation of the components of the system and which can execute program code. The system further comprises an output interface 11 to output the resulting images. This output interface can comprise a communication interface, such as a HDMI interface or any other digital communication interface. It is noted that the interfaces mentioned herein may also be implemented, for example, by means of a network connection.

Figure 3:
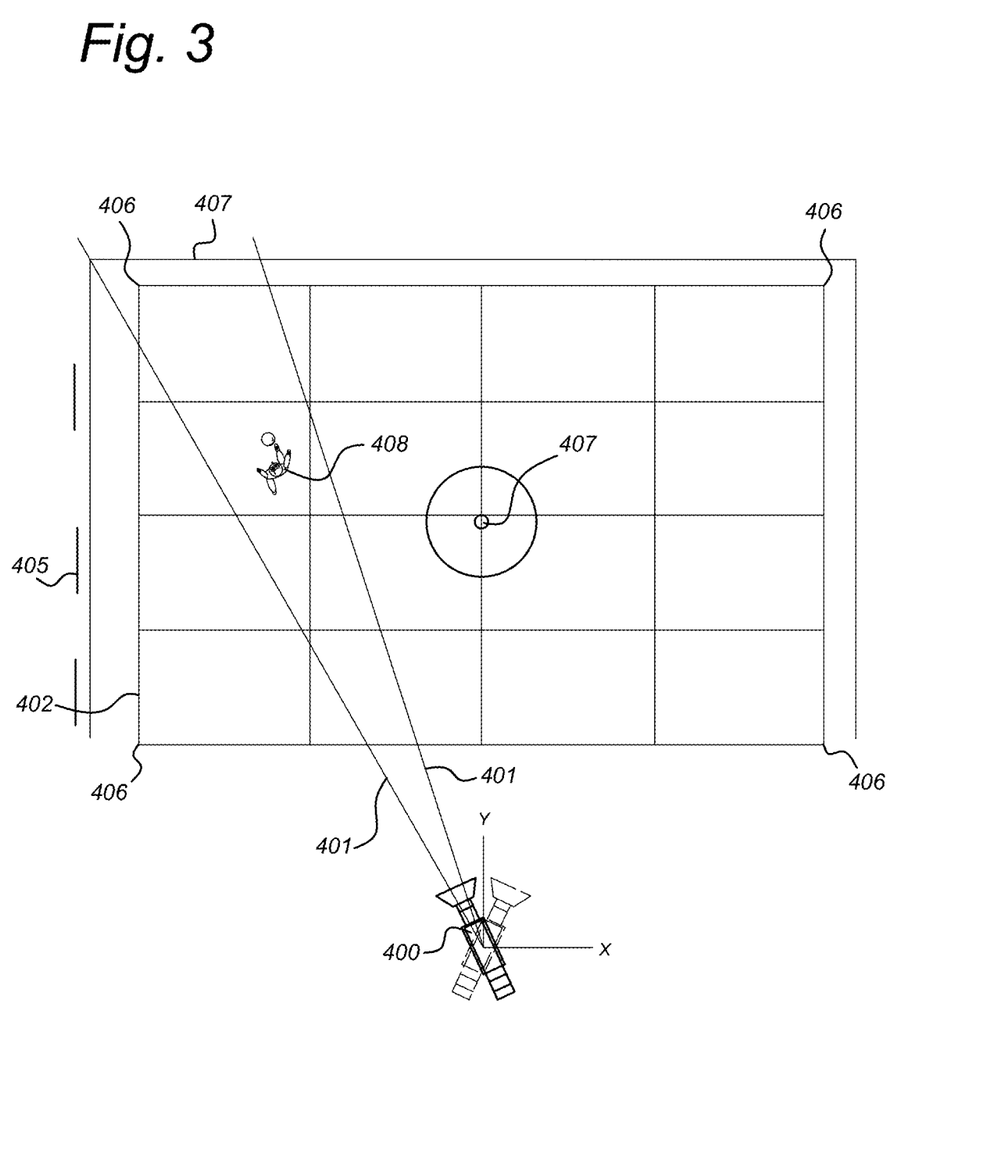
FIG. 3 is a schematic picture of a sports stadium and a camera.

FIG. 3 illustrates an example real world scene (specifically, a sports field or soccer field 402), with boards 405, 407. Further, a camera 400 is illustrated.

Referring to FIG. 1 and FIG. 3, the model of the real world space 5 may comprise a representation of one or more objects in the real world, by means of a shape model or by means of coordinates identifying certain markers that exist in the real world. For example, the corners 406 of a playing field 402 and/or the position, orientation, shape, and dimensions of one or more overlay surfaces 405, 407, which can be for example advertising boards, which may be active screens, can be represented in the real world model 5.

In operation, the camera 400 captures a series of images and transmits them to the camera image interface 3, which receives them and stores them (at least temporarily) in the storage 4. The camera 400, and/or additional devices cooperating with the camera 400, generate camera parameters, such as X, Y, and Z coordinates of the camera and orientation parameters and zoom parameters, and transmit them to the camera parameter interface 2 which forwards the received camera parameters to the positioner 8, possibly via the storage 4. The positioner 8 positions the overlay surface in the captured image. That is, when an overlay surface 407 is in the field of view 401 of the camera 400, the overlay surface is captured in the captured image and the positioner determines where in the captured image the overlay surface is, based on the coordinates of the overlay surface in the real world model 5 and the camera parameters. The detector 9 detects whether any object 408 captured by the camera 400 occludes the overlay surface 407. Image analysis techniques may be employed therefore. For example, a vision model 17 may include a descriptor of the occluding objects that may appear in the real world. That is, although the position of the occluding objects cannot be determined a priori, the image characteristics of any potential occluding objects may be predetermined and a representation thereof may be stored in the visual model 17. For example shape, color, and texture characteristics of players and/or of a ball and other objects may be predetermined and stored in the visual model 17. The overlayer 10 determines the non-occluded portion of the overlay surface in the captured image by combining the outputs of the positioner 8 and the detector 9. The overlayer 10 replaces the non-occluded portion of the overlay surface by an overlay image 7, which may be pre-stored in the storage 4, or which may be alternatively be received via another video interface (not illustrated).

The overlayer 10 outputs the image with the overlay and forwards it to the output interface 11. From there, the processed image can be transmitted to e.g. a broadcaster 13, or may be stored for later use.

Although the operation of the system has been explained for a single image, the system may typically be configured to process a sequence of images, e.g. video data. Further, the data of two or more cameras 14, 15 may be received by the camera parameter interface 2 and the camera image interface 3. The parameter data and image data of the images received from these different cameras may be combined to improve e.g. the detection of occluding objects by the detector 9. For example, one of the images (called detection image) received from camera 15 may be used to detect the occluding objects, and the other image (called selected image) received from camera 14 may be used to overlay the overlay surface, without overlaying the occluding objects detected in the image from camera 15.

The image property of the occluding object relates to a descriptor of a neighborhood of a pixel, wherein the descriptor comprises a spatial frequency, and wherein the detector is configured to compare a descriptor of a pixel of the detection image to the descriptor of the occluding object.

Besides a model of potential occluding objects, the visual model 17 may also comprise a visual model of a background. The background model is a model of the background as it would appear in the detection image. The model of the background can comprise a model of a characteristic of a texture of the background. As discussed elsewhere in the present disclosure, the detection image can be for example a color video image or an infrared image. The detector 9 may be configured to detect the occluding object further based on the model of the background. For example the image features in a newly received detection image are compared to the image features stored in the background model.

The background model may be updated according to the background in the currently received images. To that end, the system may comprise a model updater 16 for updating the model of the background based on the detection image. The model updater 16 may be configured to adjust the model of the characteristic of the texture around the pixel based on the detection image. This is further described elsewhere in this disclosure.

The detector 9 may be configured to detect the occluding object by detecting a change in a current detection image compared to an earlier captured detection image. The change reveals a moving object; occluding objects are often moving objects with respect to the background. Detection of moving objects in an image sequence is known in the art per se.

The detection image may be different from the selected captured image, and the camera interface 3 may be configured to receive the detection image and the selected captured image from different cameras 14, 15. Similarly, the camera parameter interface 2 may be configured to receive the camera parameters of the two different cameras 14, 15.

The camera 15 used to capture the detection image and the camera 14 used to capture the selected captured image may be mounted at a distance from each other so that the selected captured image and the detection image form a pair of stereo images, and wherein the image property of the occluding object relates to a disparity between the two stereo images. The background and any occluding objects have, by definition, a different distance from the camera, and hence the disparity in a pair of stereo images will be different. By analyzing the differences in disparity the detector 9 can distinguish the background/overlay surface from the occluding objects.

The camera 15 used to capture the detection image can be configured to detect radiation other than visible light, for example near infrared, infrared, or ultraviolet light.

The camera 15 used to capture the detection image and the camera 14 used to capture the selected captured image can be configured to receive radiation through the same objective or two different objectives. In case the same objective is used, a beam splitter can be used to guide the light to both cameras 14 and 15.

The overlay surface 407 in the model can correspond to a display device in the real world. This allows to overlay the image displayed by the display device with another image in e.g. a television broadcast.

The display device can be configured to display a moving image on the display device in the real world, wherein the overlayer 10 is configured to overlay the moving image with the overlay image in the selected captured image. This allows to replace one moving image with another moving image, or with a static image. Alternatively, the display device may be configured to display a static image on the display device in the real world and wherein the overlayer is configured to overlay the static image with the overlay image in the selected captured image. Depending on the detection technique used, it does not matter for the detector 9 what visible image is displayed by the display device or whether it is a moving image or not. If the detector 9 uses a detection image of non-visible light such as a near infrared image, the displayed image does not influence the detection image significantly.

The display device is configured to emit radiation in one or more pre-determined frequency ranges. For example, an LED display can have red, green, and blue LEDs with a narrow frequency bandwidth. These different frequency bandwidths may have gaps in between. The camera 15 used to capture the detection image can be configured to detect radiation outside all of the one or more pre-determined frequency ranges and distinguish the detected radiation outside all of the one or more pre-determined frequency ranges from radiation inside the one or more pre-determined frequency ranges. For example, a frequency below the red LED frequency range can be detected, or a frequency above the blue LED frequency range, or a frequency in between the red LED and green LED frequency range, or a frequency in between the green LED frequency range and the blue LED frequency range. Herein, LED may be replaced with any light emitting pixel (or light reflecting pixel) of a display. Moreover, the detected frequency in the detection image may be in the visible light range or outside the visible light range. A filter may be used to filter the light to selectively guide only the light of one or more of the above-described frequencies to the camera 15 that captures the detection image.

As the board itself is not needed to position the overlay surface in the selected image or in the detection image, nor to detect the occluding objects, it is also possible to define one or more overlay surfaces in the model 5 of the real world space which do not exist as any physical surface in the real world. Such an overlay surface may be called a virtual surface.

As already mentioned, the overlay surface may be represented in the model by an indication of at least a shape, position, and orientation of the overlay surface in the real world space.

Figure 4:
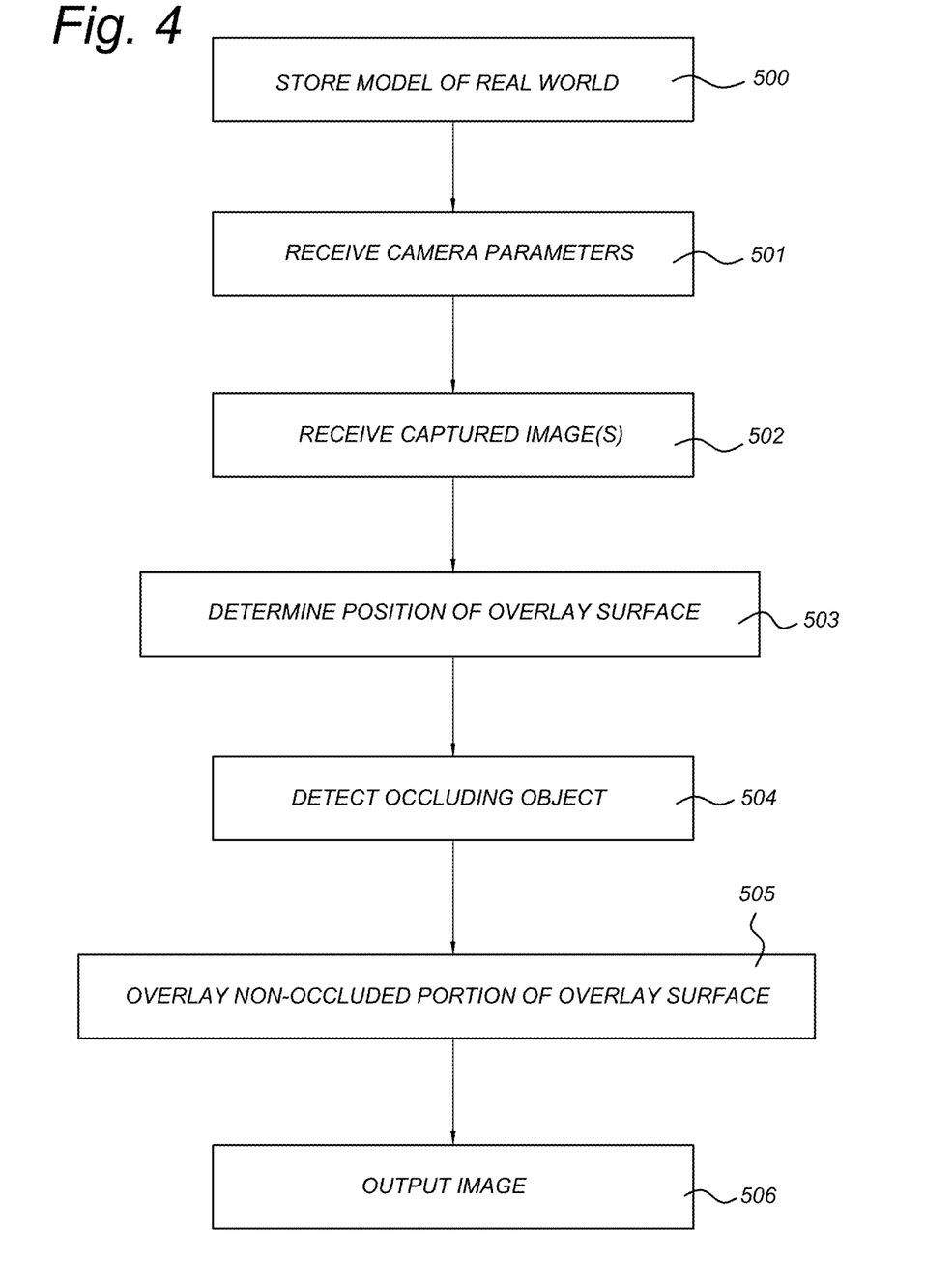
FIG. 4 is another flowchart of a method of digitally overlaying an image with another image.

FIG. 4 illustrates a method for overlaying an image. The method comprises the steps of: storing 500 a model of a real world space, wherein the model includes an overlay surface to be overlaid with an overlay image; receiving 501 camera parameters, which calibrate at least one camera with respect to coordinates of the model; receiving 502 at least one image captured with respective said at least one camera substantially at the same time; determining 503 a position of the overlay surface within said at least one captured image based on the model and the camera parameters; detecting 504 an occluding object at least partially occluding the overlay surface in a selected captured image of said at least one captured image based on an image property of the occluding object and a detection image that is an image of said at least one captured image; overlaying 505 a non-occluded portion of the overlay surface in the selected captured image with the overlay image to obtain an output image; and outputting 506 the output image. The method may be implemented in software, as a computer program product comprising instructions for causing a computer to perform the steps set forth. The computer program may be stored in a non-tangible media.

Below, some more specific examples of the system and method will be provided. It should be noted, however, that these examples serve to better understand the disclosure, and not to limit the scope of protection.

Using the Model of the Real World

In the digital overlay application a mathematical model is used that represents the real world. This mathematical model can be constructed by means of a collection of points in the 3D world and their interconnectivity. Multiple connected 3D points can describe a surface in the 3D world. The digital overlay application makes use of these 3D models to describe the real world. A running example though this document to explain how this technique can be used, will be in the context of a soccer event. In a typical high level soccer event there is pitch side advertisement brought to the spectator on for example LED screens. In a particular implementation, only these LED screens in the real world will be replaced by the digital overlay application. It is important that the 3D model corresponds as closely as possible to the real world model. For example, the position of the individual screens can be measured by means of a laser measurement device for X, Y and Z. It is important to choose an origin before measuring. A good choice is, in the case of the soccer event, one of the four corners. Besides a manual measurements of the boards, the actual position of the boards can also be computed with the aid of the LED screen, by means of projecting a series of binary patterns on the screen and identifying these changes in a calibrated camera or set of horizontally shifted calibrated cameras.

In order to define a mapping between the mathematical model and the real world, a camera is needed. The mapping is made from the real world to the camera space and back to the real world. A camera has several parameters that mathematically describe the status of the camera. These parameters include: position, viewing direction, image size and several lens parameters. They can be split in two groups: intrinsic and extrinsic parameters, in which the extrinsic parameters describe the position and rotation of the camera and the intrinsic parameters describe the non-linear lens- and sensor attributes. The extrinsic parameters can be measured, for example: the position can be measured with a laser measurement tool and the rotation can be measured with sensors build in the camera's tripod that register the rotation of the camera in both axis. The intrinsic parameters, however, need to be modelled according to the used objective. Different methods can be used to build a heuristic model that simulates the intrinsic parameters of the used lens system. Some lenses allow to read out some of the intrinsic parameters like: zoom, focus and iris. These parameters can also be determined with image based lens calibration techniques, using for example the well known checker-board patterns. The intrinsic parameters are related with the non-linear lens distortion, mostly known as barrel or pincushion distortion. This distortion makes straight lines not straight in the projected image and is best known from the fisheye lens. The distortion can be modelled for each intrinsic parameter set as it changes when the lenses change position. The distortion can be defined by a curvature and a centre of impact, from where the distortion is applied. When using lens system with rotating lenses this centre of impact can also rotate as the lenses rotate. For moving cameras and different lens settings different intrinsic and extrinsic parameters can be computed. This is especially the case for the example of the soccer event where typical camera movement is defined by changing the orientation of the camera (extrinsic) together with zoom, focus and iris movements (intrinsic). Once the intrinsic and extrinsic parameters are known, a calibration matrix can be built according to the state of the art methods as for example described in the literature: for example the book "Multiple View Geometry in Computer Vision" by Richard Hartley and Andrew Zisserman. Using the calibration matrix, calculations can be made in a common space, the camera space. With a projective operation the mathematically modelled world is mapped to the same camera space as the real camera. That means that the mathematically modelled items of the mathematically modelled world will match exactly with the real world features. When applied to the soccer event example: the mathematically modelled advertisement boards will map perfectly on the real world advertisement boards, the mathematically modelled pitch lines will map perfectly on the real world pitch lines. Strong salient real world features can be used to control the quality of the mapping. For example: pitch lines, stadium architecture, and more.

Detection of the Occluding Object: Stereo Image.

As the mathematical model of the real world is known, or at least partially, this information can also be used to identify occluding objects. The mathematical model describes a known shape of the real world. If the real shape of the real world can be computed in real time, an algorithm could be implemented to match the expected 3D mathematical model with the computed mathematical model. If there is a big difference in the two mathematical models there is an occluding object in front of the known mathematical model. Since this location is known in the mathematical 3D model it can be re-projected to the real world in the camera space and matched to individual pixels in the camera image. A real-time depth map is used for this algorithm. This can be computed with a pair of calibrated stereo cameras using a fast plane sweep method or a disparity matching algorithm. The algorithm to match the two mathematical models takes as input the two mathematical models and rasterizes them into individual depth maps. Typically the raster element size will be in the same order of magnitude as the pixel size. Once these depth maps are computed, a per raster element comparison can be made, using a threshold operation to mark differences that are large enough. These results are stored per raster element into an intermediate data object that can easily be converted into an image. This image can be further refined to filter out wrong responses, for example with a median filter or with some morphological operations, in order to open or close the shape. Since each pixel of the intermediate image corresponds with a raster element of the depth map, the image can be re-projected to the camera space and use it as an occluding object mask.

Detection of Occluding Objects Using Active Boards.

Figure 5A:
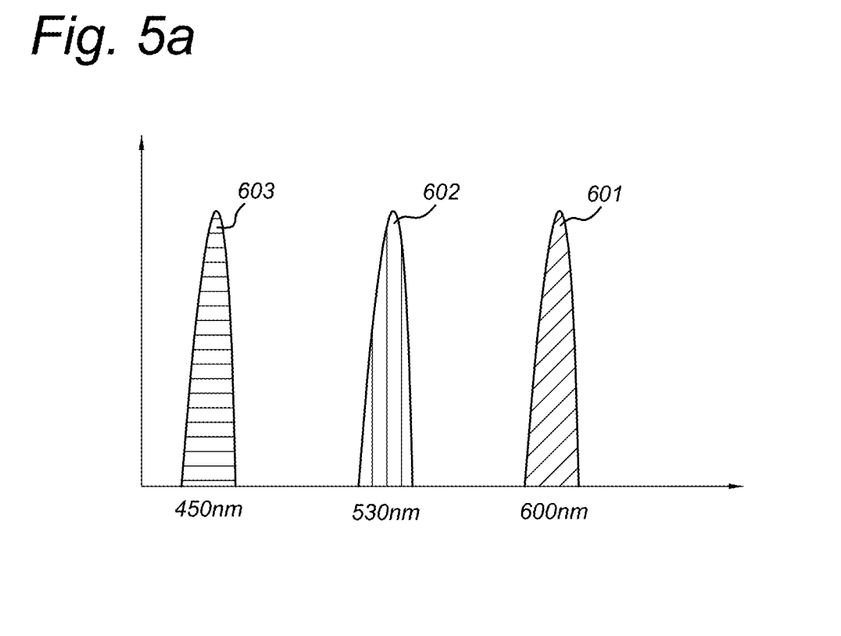
FIG. 5a is a sketch of a frequency response of a display screen.
Figure 5B:
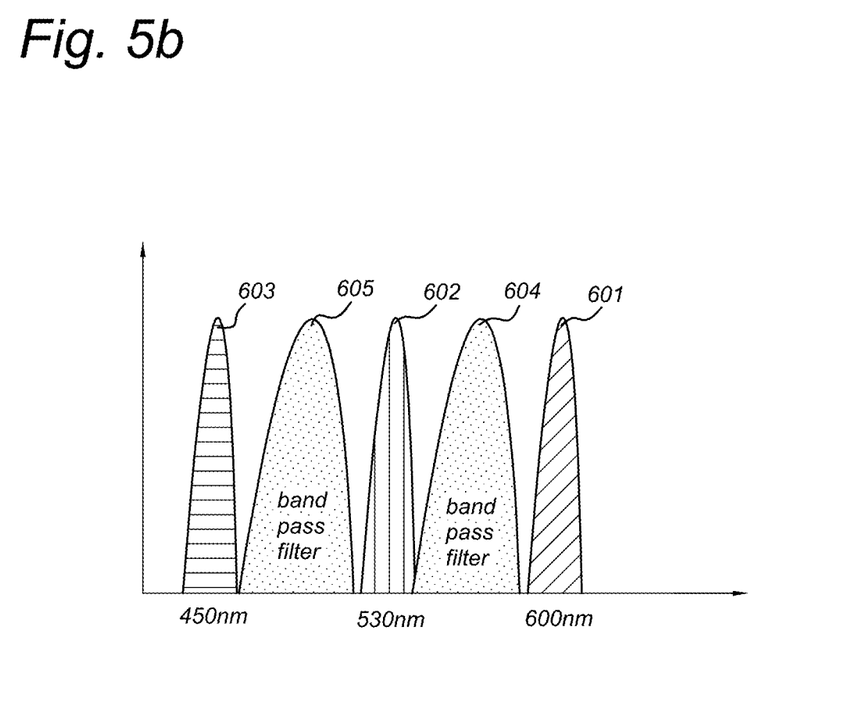
FIG. 5b is a sketch of a frequency response of a display screen and frequency response of a filter.

In a lot of high value sport events, like soccer, one does typically not want to use static or wooden advertisement boards, but dynamic active boards that can display multiple advertisements over time in order to increase advertisement revenue. These boards, typically LED boards, are able to display static images as well as moving videos. They can even display videos of real life sized soccer players. LED boards generate their colour by mixing at least three independent colours. Each pixel of an LED board therefore can consist of at least three individual LEDs. They can be grouped together in a Surface-Mount-Device (SMD). Each LED of a pixel can have a unique colour, for example in most known configurations it will be red, green and blue. These are called the base colours. By mixing these base colours, these boards can create the visual perception that any other colour can be generated. The LEDs can be chosen in such a way that the individual frequency response of the respective base colours is very narrow and has virtually no spill to neighbouring or non-neighbouring regions in the spectrum. The LED board will have a frequency response similar to the one illustrated in FIG. 5a. The light emitted by the LED board has three separate frequency bands, visible as peak 601 for red, 602 for green, and 603 for the blue frequency range. If one captures the LED board with a camera equipped with a special spectral filter, for example a bandpass filter that only allows light at a small controlled frequency spectrum, one could choose this spectral bandpass filter such that it falls in between the spectral responses of the LED board in the visible light. This is illustrated in FIG. 5b. A filter could have frequency response 604 in between the red and green frequency bands, or frequency response 605 in between the green and blue frequency bands. The image captured by this setup will not be influenced by any changes displayed on the LED screen, therefore due to the nature of the screen the LED screen will have a uniform, monotone distribution as if it was not active on the captured detection image. Since occluding objects typically are real world objects and have very complex frequency response curves, they are still visible in the captured detection image. Changes between static background and moving foreground can be fed into one of the algorithms to compute the occluding object, based on the properties of the occluding object and/or a background model.

One can easily extend this method and apply the special spectral bandpass filter in a range in the non-visible light. Also in this case the captured image will not show any signs of the videos played back on the active screens.

Detection of Occluding Objects Using Spatial Frequency Differences.

A hypothesis may be as follows: If the mathematical model of the real world is known and at least one camera is calibrated, the combined information can be used to identify the location of the surface that needs to be replaced by the digital overlay application. As described in the previous section, this surface (active or not, available in the real world or not) can be captured by a sensor in such a way that the texture on the surface appears to be static in the captured image while it has moving or static content when seen by the human eye.

In this section three algorithms are described that could be used in order to detect occluding objects based on image properties of the occluding object.

Algorithm 1: Occluding object detection based on local Regional Spatial difference descriptor. A descriptor is a multi-dimensional vector containing information that describes a local neighborhood. A descriptor can include edge, corner, first order gradient, shape, colour, texure, motion information amongst others. A good choice of a descriptor is a scale and rotation invariant descriptor that is able to describe local textural information and region homogeneity. Typical examples of these descriptors are: Homogeneous Texture descriptor, EdgeHistogram descriptor, SIFT/SURF descriptor, Region based descriptor, Spatiotemporal locator Descriptor, and others exist. The descriptor is typically computed for each pixel in the input image of the detection image. From this calculation a per pixel background model containing a descriptor of local texture information around the pixel can be calculated for each pixel. This background model represents the past and therefore (based on the hypothesis at the beginning of this section) also the expected value. Next, for each following input detection image and for each pixel of this image the local texture descriptor is computed again. This local texture descriptor is compared to the corresponding descriptor of the background model. Based on this comparison the likelihood is computed that this pixel belongs to the background. The respective pixel in the model is updated based on the same likelihood function. If the likelihood is high that the pixel belongs to the background, the background model is updated fast to take account of the changed background, if not the background model is updated slowly, if at all.

In a final step the likelihood function can be combined with the past temporal information. The past temporal information can be in the form of in memory saved likelihood function responses of previous detection input images. The combination of the past temporal information gives more information to the final decision if the pixel belongs to the occluding objects or not, which information can be used to generate a masking image.

Algorithm 2: Occluding object detection based on Spatial frequencies. Spatial frequencies can be computed using the FFT function or by analyzing a small region around the pixel and applying a multi band convolution filter to that region. A multiband convolution filter can be constructed by selectively sampling spatial frequencies. For example, if only neighbouring pixels are used, it represents the highest possible spatial frequency. If pixels at a certain distance, for example five pixels away are used, it represents a lower frequency. Combining multiple convolution filters with different convolution sizes generates a multi-band convolution filter. For example, a multiband convolution filter can be constructed from a simple Laplacian filter, for the highest frequencies, and with an increased sample region for each lower spatial frequency band.

The background can have some known per-pixel static spatial frequency distribution. This can be computed with the multi-band convolution filter. This filter will give a response for each individual band. Occluding objects, on the other hand, have no per pixel static spatial frequencies. Occluding objects are typically identified by high spatial frequencies. Occluding objects can be moving and they contain a lot of edges and corners. Edges and corner can be seen as high spatial frequencies. Therefore, regions with a lot of changes in the high frequencies are marked with a high likelihood to be an occluding object.

Algorithm 3: Occluding object detection based on Mixture of Gaussians. For each pixel and for each color channel, a background model is created based on the Mixture of Gaussians algorithm. Comparing the difference of the pixel of a new incoming captured detection image with the corresponding pixel of the model generates a function that expresses the likelihood of the pixel belongs to the background model. Based on statistical analysis the model can be updated with the new information of the pixel. This way, the model can learn the new situations.

The result of all above described algorithms can be refined with some noise reduction filters, like median filters or low-pass filters. The output mask can be refined by means of morphological operations, like erosion and dilation, and non-morphologic operations specialized in matting in order to generate high quality results. Examples of these techniques are graph-cut, grab-cut, trilevel alpha matting, where the input to these individual algorithms can include the likelihood function and the real camera image.

Setup of the System.

During a soccer event, the digital overlay application is typically used in combination with the equipment of the host broadcaster. The host broadcaster is responsible for the image quality, the setup of the equipment and the outgoing stream. Therefore, the digital overlay application may be implemented in a way that limits the interference with the work-flow of the setup of the host broadcasters.

One can choose to use a beam splitter placed between the broadcaster's lens and camera. The beam splitter gives the possibility to attach an independent sensor. This sensor will capture roughly the same information as the image sensor of the broadcaster. However, this sensor can be completely controlled by the application without having to interfere with the image and quality settings of the broadcaster's sensor. Besides using a beam splitter to capture the same perspective image as the broadcast camera, one could also opt for one calibrated static camera, with a high resolution sensor and a fisheye lens covering the entire range of the broadcast camera, or a set of calibrated cameras covering the entire range of the broadcast camera. Since all cameras are calibrated, one can easily warp the images from one calibrated camera to the broadcasters calibrated camera that represents the camera space.

Based on the chosen approach the incoming light in the extra sensor, through beam splitter or own optics, could be a specific spectrum from the visible or non-visible light. For example it could be a special spectral bandpass filter in the visible light as explained above.

Figure 2:
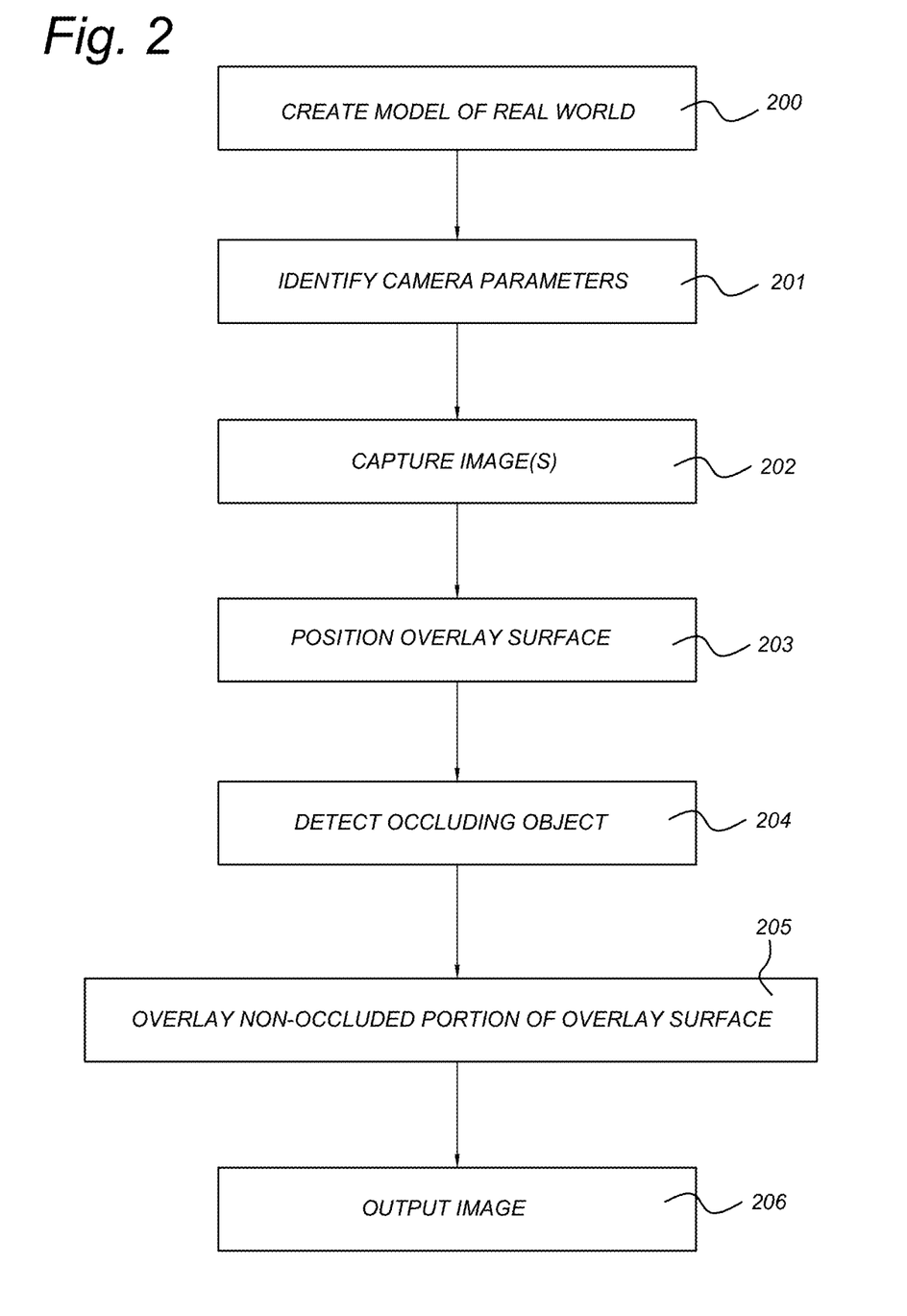
FIG. 2 is a flowchart of a method of digitally overlaying an image with another image.

Some aspects of the present disclosure are described in the following clauses, with reference to FIG. 2.

Clause 1. A method of digitally overlaying an image with another image, comprising creating 200 a model of a real world space, wherein the model includes an overlay surface to be overlaid with an overlay image;

identifying 201 camera parameters, which calibrate at least one camera with respect to coordinates of the model;

capturing 202 at least one image with respective said at least one camera substantially at the same time;

positioning 203 the overlay surface within said at least one captured image based on the model and the camera parameters;

detecting 204 an occluding object at least partially occluding the overlay surface in a selected captured image of said at least one captured image based on an image property of the occluding object and a detection image that is an image of said at least one captured image;

overlaying 205 a non-occluded portion of the overlay surface in the selected captured image with the overlay image.

Optionally, after overlaying the selected captured image, it may be output 206.

Clause 2. The method of Clause 1, wherein the image property of the occluding object relates to a spatial frequency of the occluding object compared to a spatial frequency of a background.

Clause 3. The method of Clause 1, further comprising updating a model of a background based on the detection image;

wherein the detection of the occluding object is further based on the model of the background.

Clause 4. The method of Clause 3, wherein the model of the background comprises a characteristic of a texture around a pixel in a background portion of the detection image;

and wherein the updating the model of the background comprises adjusting the characteristic of the texture around the pixel based on the detection image.

Clause 5. The method of Clause 1, further comprising detecting the occluding object by detecting a change in a current detection image compared to an earlier captured detection image.

Clause 6. The method of Clause 1, wherein the detection image is different from the selected captured image, and the camera used to capture the detection image and the camera used to capture the selected captured image are mounted at a distance from each other so that the selected captured image and the detection image form a pair of stereo images, and the image property of the occluding object relates to a disparity between the two stereo images.

Clause 7. The method of Clause 1, wherein the overlay surface in the model represents a display device in the real world.

Clause 8. The method of Clause 7, comprising displaying a moving image on the display device in the real world and overlaying the moving image with the overlay image in the selected captured image.

Clause 9. The method of Clause 7, comprising displaying a static image on the display device in the real world and overlaying the static image with the overlay image in the selected captured image.

Clause 10. The method of Clause 7, wherein the display device emits radiation in one or more pre-determined frequency ranges, and the camera used to capture the detection image detects radiation outside all of the one or more pre-determined frequency ranges and distinguishes the detected radiation outside all of the one or more pre-determined frequency ranges from radiation inside the one or more pre-determined frequency ranges.

Clause 11. The method of Clause 10, wherein the camera used to capture the detection image detects visible light outside all of the one or more pre-determined frequency ranges and distinguishes the detected visible light outside all of the one or more pre-determined frequency ranges from visible light inside the one or more pre-determined frequency ranges.

Clause 12. The method of Clause 1, wherein the overlay surface represents a virtual surface that is nonexistent in the real world.

Clause 13. The method of Clause 1, wherein the detection image is different from the selected captured image.

Clause 14. The method of Clause 1, wherein the step of capturing at least one image comprises capturing the detection image with a camera configured to detect radiation other than visible light.

Clause 15. The method of Clause 1, wherein the camera used to capture the detection image and the camera used to capture the selected captured image are configured to receive radiation through the same objective or two different objectives.

Clause 16. The method of Clause 1, wherein the overlay surface is represented in the model by an indication of at least a shape, position, and orientation of the overlay surface in the real world space.

It is noted that the techniques disclosed herein may be applied to one or more cameras. For example, a plurality of cameras may be used to cover a sports event and produce a sports broadcast. The methods and systems set forth herein may be applied to each camera. For example, the overlay is applied to the captured camera image that is currently on air.

The digital overlay can, for example, be used for the following applications: Change of language of a sign, change of product or product model advertised, change of appearance such as colours, font, letter size, animation etc, advertisements by different sponsors, still content. animated content, animation that interacts with the camera movement. In the latter case, the overlay image may be generated in dependence on the camera parameters.

The system may be distributed over different locations. For example, the camera or cameras can be located at a first site, and the system for digitally overlaying an image can be located at a different location. In such a case, the camera parameters, and the camera images including the selected captured image and the detection image, are transmitted from the location where the camera is located to the location where the system for digitally overlaying an image is located. For example, the latter may be located and/or operated by a national broadcasting organization, so that each broadcasting organization can add their own overlay to the broadcast video. Further, the overlay may be personalized, so that different subscribers/viewers receive different overlays.

Some or all aspects of the invention may be suitable for being implemented in form of software, in particular a computer program product. Such computer program product may comprise a storage media, such as a memory, on which the software is stored. Also, the computer program may be represented by a signal, such as an optic signal or an electro-magnetic signal, carried by a transmission medium such as an optic fiber cable or the air. The computer program may partly or entirely have the form of source code, object code, or pseudo code, suitable for being executed by a computer system. For example, the code may be executable by one or more processors.

The examples and embodiments described herein serve to illustrate rather than limit the invention. The person skilled in the art will be able to design alternative embodiments without departing from the scope of the claims. Reference signs placed in parentheses in the claims shall not be interpreted to limit the scope of the claims. Items described as separate entities in the claims or the description may be implemented as a single hardware or software item combining the features of the items described.

The invention claimed is:

1. A system for digitally overlaying an image with another image, comprising
   a storage for storing a model of a real world space, wherein the model includes an overlay surface to be overlaid with an overlay image, wherein the overlay surface in the model represents a display device in the real world, wherein the display device is configured to display a moving image on the display device in the real world by emitting radiation in one or more pre-determined frequency ranges;
   a camera parameter interface for receiving camera parameters, which calibrate at least one camera with respect to coordinates of the model;
   a camera image interface for receiving at least one image captured with respective said at least one camera substantially at the same time, said at least one captured image comprising a detection image, wherein the camera used to capture the detection image is configured to detect radiation having a frequency outside all of the one or more pre-determined frequency ranges and distinguish the detected radiation outside all of the one or more pre-determined frequency ranges from radiation inside the one or more pre-determined frequency ranges;
   a positioner for determining a position of the overlay surface within said at least one captured image based on the model and the camera parameters;
   a detector for detecting an occluding object at least partially occluding the overlay surface in a selected captured image of said at least one captured image based on an image property of the occluding object and the detection image;
   an overlayer for overlaying a non-occluded portion of the overlay surface in the selected captured image with the overlay image to obtain an output image, wherein the overlayer is configured to overlay the moving image displayed on the display device in the real world with the overlay image in the selected captured image; and
   an output interface for outputting the output image.

2. The system of claim 1, wherein the image property of the occluding object relates to a descriptor of a neighborhood of a pixel, wherein the descriptor comprises a spatial frequency, and wherein the detector is configured to compare a descriptor of a pixel of the detection image to the descriptor of the occluding object.

3. The system of claim 1, further comprising a model updater for updating a model of a background based on the detection image;
   wherein the detector is configured to detect the occluding object further based on the model of the background.

4. The system of claim 3, wherein the model of the background comprises a model of a characteristic of a texture of the background;
   and wherein the model updater is configured to adjust the model of the characteristic of the texture around the pixel based on the detection image.

5. The system of claim 1, wherein the detector is configured to detect the occluding object by detecting a change in a current detection image compared to an earlier captured detection image.

6. The system of claim 1, wherein the detection image is different from the selected captured image, and the camera interface is configured to receive the detection image and the selected captured image from different cameras.

7. The system of claim 6, wherein the camera used to capture the detection image and the camera used to capture the selected captured image are mounted at a distance from each other so that the selected captured image and the detection image form a pair of stereo images, and wherein the image property of the occluding object relates to a disparity between the two stereo images.

8. The system of claim 6, wherein the camera used to capture the detection image is configured to detect radiation other than visible light.

9. The system of claim 6, wherein the camera used to capture the detection image and the camera used to capture the selected captured image are configured to receive radiation through the same objective or two different objectives.

10. The system of claim 1, wherein the display device is configured to display a static image on the display device in the real world and wherein the overlayer is configured to overlay the static image with the overlay image in the selected captured image.

11. The system of claim 1, wherein the camera used to capture the detection image is configured to detect visible light outside all of the one or more pre-determined frequency ranges and to distinguish the detected visible light outside all of the one or more pre-determined frequency ranges from visible light inside the one or more pre-determined frequency ranges.

12. The system of claim 1, wherein the overlay surface represents a virtual surface that is nonexistent in the real world.

13. The system of claim 1, wherein the overlay surface is represented in the model by an indication of at least a shape, position, and orientation of the overlay surface in the real world space.

14. A method of digitally overlaying an image with another image, comprising
- creating a model of a real world space, wherein the model includes an overlay surface to be overlaid with an overlay image, wherein the overlay surface in the model represents a display device in the real world, wherein the display device is configured to display a moving image on the display device in the real world by emitting radiation in one or more pre-determined frequency ranges;
- identifying camera parameters, which calibrate at least one camera with respect to coordinates of the model;
- capturing at least one image with respective said at least one camera substantially at the same time, said at least one captured image comprising a detection image, wherein the camera used to capture the detection image is configured to detect radiation having a frequency outside all of the one or more pre-determined frequency ranges and distinguish the detected radiation outside all of the one or more pre-determined frequency ranges from radiation inside the one or more pre-determined frequency ranges;
- positioning the overlay surface within said at least one captured image based on the model and the camera parameters;
- detecting an occluding object at least partially occluding the overlay surface in a selected captured image of said at least one captured image based on an image property of the occluding object and the detection image;
- overlaying a non-occluded portion of the overlay surface in the selected captured image with the overlay image, by overlaying the moving image displayed on the display device in the real world with the overlay image in the selected captured image.

15. A non-transitory computer-readable medium on which is stored a computer program product comprising instructions that, when executed by a computer, cause the computer to perform the steps of
- storing a model of a real world space, wherein the model includes an overlay surface to be overlaid with an overlay image, wherein the overlay surface in the model represents a display device in the real world, wherein the display device is configured to display a moving image on the display device in the real world by emitting radiation in one or more pre-determined frequency ranges;
- receiving camera parameters, which calibrate at least one camera with respect to coordinates of the model;
- receiving at least one image captured with respective said at least one camera substantially at the same time, said at least one captured image comprising a detection image, wherein the camera used to capture the detection image is configured to detect radiation having a frequency outside all of the one or more pre-determined frequency ranges and distinguish the detected radiation outside all of the one or more pre-determined frequency ranges from radiation inside the one or more pre-determined frequency ranges;
- determining a position of the overlay surface within said at least one captured image based on the model and the camera parameters;
- detecting an occluding object at least partially occluding the overlay surface in a selected captured image of said at least one captured image based on an image property of the occluding object and the detection image;
- overlaying a non-occluded portion of the overlay surface in the selected captured image with the overlay image to obtain an output image by overlaying the moving image displayed on the display device in the real world with the overlay image in the selected captured image; and
- outputting the output image.

* * * * *